(12) United States Patent
Kimura et al.

(10) Patent No.: US 6,687,763 B2
(45) Date of Patent: Feb. 3, 2004

(54) ATAPI COMMAND RECEIVING METHOD

(75) Inventors: Yoko Kimura, Ehime (JP); Yasushi Ueda, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 408 days.

(21) Appl. No.: 09/785,470

(22) Filed: Feb. 20, 2001

(65) Prior Publication Data

US 2001/0021951 A1 Sep. 13, 2001

(30) Foreign Application Priority Data

Feb. 17, 2000 (JP) ........................................ 2000-040067

(51) Int. Cl.[7] ........................ G06F 13/00; G06F 13/14; G06F 12/00
(52) U.S. Cl. .................. 710/5; 710/1; 710/52; 710/53; 710/57; 710/62; 710/64; 710/72; 710/74; 711/152; 711/153; 711/169; 711/173; 712/1; 712/225
(58) Field of Search ............................ 710/1, 5, 14, 52, 710/53, 56, 57, 62, 64, 72, 74; 711/1, 152, 153, 169, 173; 712/1, 225

(56) References Cited

U.S. PATENT DOCUMENTS 5,860,089 A * 1/1999 Ishii ........................ 711/112
5,890,210 A * 3/1999 Ishii et al. ................. 711/113
5,923,897 A * 7/1999 Lipe et al. ...................... 710/5
6,088,742 A * 7/2000 Sim ............................ 710/52
6,324,594 B1 * 11/2001 Ellis et al. ...................... 710/5
6,408,357 B1 * 6/2002 Hanmann et al. .......... 711/113

FOREIGN PATENT DOCUMENTS

JP    6-35847    2/1994

* cited by examiner

Primary Examiner—Kim Huynh
Assistant Examiner—Tanh Q. Nguyen
(74) Attorney, Agent, or Firm—Wenderoth, Lind & Ponack, L.L.P.

(57) ABSTRACT

The present invention provides an ATAPI command receiving method in which the CPU 72 can quickly correspond to other processings without expending much time for capturing data, as well as it can be prevented that data which are being captured by the CPU should be destroyed. In this ATAPI command receiving method, when an ATAPI protocol control LSI 71 comprising a shared register storage area 711 (including a data FIFO 7112 for containing command packets) for receiving a command from the host computer via an ATA bus 2, and a buffer memory 712 which can be used as a RAM of a CPU 72 receives a command, shared register values (including a command packet value) are stored at a storage destination address in the buffer memory 712 which is designated by the CPU 72, when the data storage permission is given by the CPU 72.

3 Claims, 6 Drawing Sheets

Fig.1

Fig.2 address A designated by CPU
(for command being
processed by CPU)

Fig.3

Fig.4 address D designated by CPU
(for command being
processed by CPU)

ATAPI COMMAND RECEIVING METHOD

FIELD OF THE INVENTION

The present invention relates to a command receiving method of a LSI which controls an ATAPI (AT Attachment Packet Interface) protocol and, more particularly, to an ATAPI command receiving method which can reduce a processing time of a CPU.

BACKGROUND OF THE INVENTION

ATAPI is a standard which is created by that the ATA standard for an interface between a host computer and an integral hard disk is expended for use in multi-media devices, and details thereof are determined by the X3T13 Committee.

Hereinafter, the prior art ATAPI command receiving method is described with reference to FIGS. 5 and 6.

Figure 5:
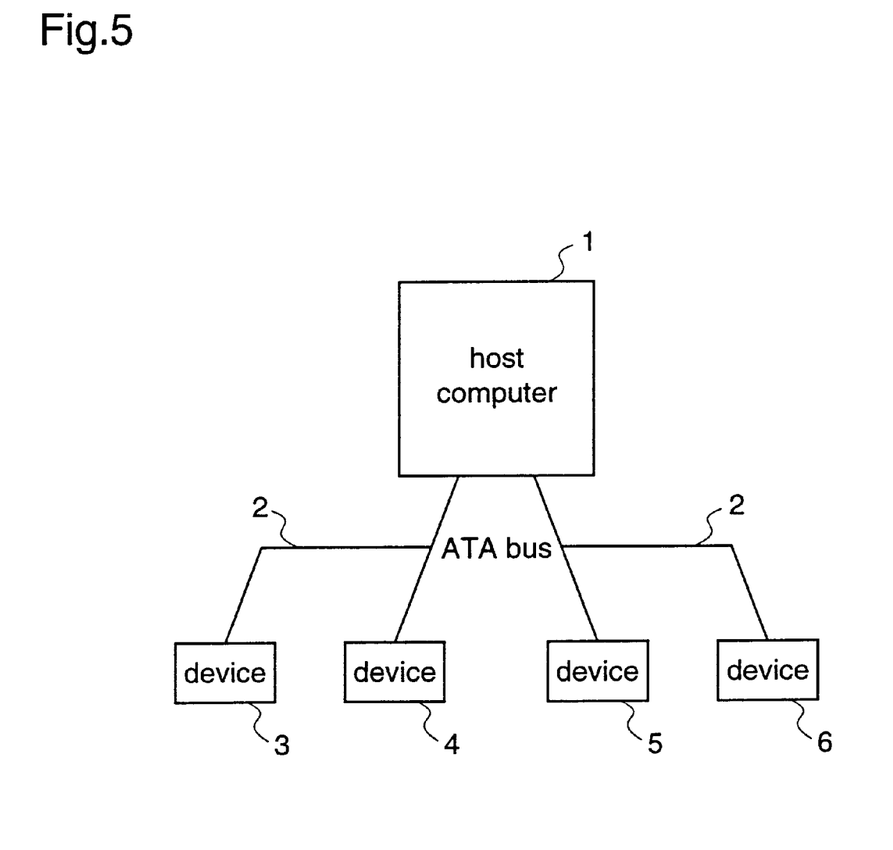
FIG. 5 is a conceptual diagram showing a state that a host computer and a system are connected by ATA buses.

FIG. 5 shows a structure where devices 3~6 are connected to a host computer 1 via ATA buses 2.

The devices 3~6 are devices for supporting the ATA protocol or devices for supporting the ATAPI protocol. Here, assume that these devices are the devices supporting the ATAPI protocol. As shown in FIG. 6, the device 3 comprises a LSI (ATAPI protocol control LSI) 31 for controlling the ATAPI protocol, a CPU 32 for decoding a command received from the host computer 1 and executing a processing in accordance with the command, and a RAM 33 which is accessed by the CPU 32.

Figure 6:
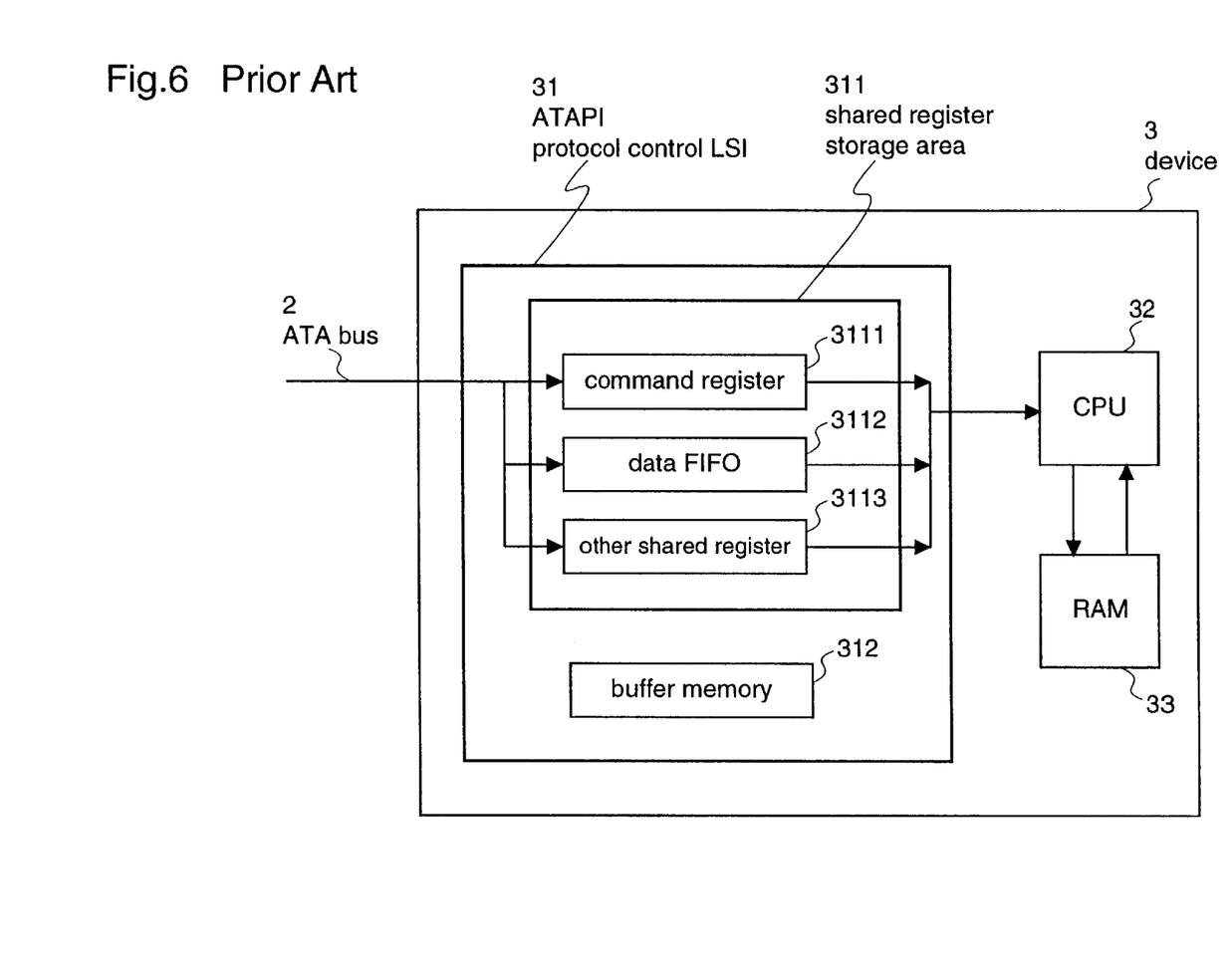
FIG. 6 is a conceptual diagram showing a structure of a device which uses the prior art command processing method and the flow of a command in the device.

FIG. 6 further shows the structure of the device 3 which is accessed via the ATA bus 2 and the flow of command data. To be more specific, the ATAPI protocol control LSI 31 controls the ATAPI protocol via the ATA bus 2, the CPU 32 controls the device 3, and the RAM 33 is accessed by the CPU 32.

The ATAPI protocol control LSI 31 comprises a shared register storage area 311 for accessing the host computer 1, and a buffer memory 312 which can be used as a RAM of the CPU 32.

The shared register storage area 311 contains an ATAPI-protocol-defined command register 3111, a data FIFO (First in First out) 3112 for temporarily storing command packets or access data which are issued from the host computer 1 to data registers of shared registers, and an other shared register 3113.

A description is given of the ATAPI command receiving method in the device 3 having the above-mentioned structure in the case where the host computer 1 selects the device 3 among the devices 3~6 and issues a command to the device 3 via the ATA bus 2.

The host computer 1 accesses the shared register storage area 311 of the device 3 selected from the devices 3~6 which are connected to the host computer 1, via the ATA bus 2, and transmits one-byte command and a batch of commands (hereinafter, referred to as "a command packet") to the shared register storage area 311. Here, the command packet is an expanded function of the ATA protocol, and it is plural-byte command data which are set by an exchange of a command (IDENTIFY PACKET DEVICE command) between the host computer 1 and the device 3 when the host computer 1 is activated.

When the command according to the ATAPI protocol is issued from the host computer 1 to the device 3 via the ATA bus 2, the ATAPI protocol control LSI 31 stores a value of the command register accessed by the host computer 1 into the command register 3111 in the shared register storage area 311, a value of the command packet accessed by the host computer 1 into the data FIFO 3112 in the shared register storage area 311, and values of other shared registers accessed by the host computer 1 into the other shared register 3113 in the shared register storage area 311, respectively, and then outputs an interruption signal to the CPU 32.

When the CPU 32 receives the interruption signal, it starts interrupt processing routine, accesses the command register 3111, the data FIFO 3112 or the other shared register 3113 in the ATAPI protocol control LSI 31, in the interrupt processing routine, and stores the values stored therein in the RAM 33.

When the CPU 32 finishes the interrupt processing routine, it returns to a command processing routine as the normal process, extracts the stored values from the RAM 33 in the command processing routine, and executes the command processing.

As described above, in the prior art ATAPI command receiving method, when the command is received, the CPU 32 recognizes the interruption from the ATAPI protocol control LSI 31, accesses the shared register storage area 311 of the ATAPI protocol control LSI 31 in the interrupt processing routine of the CPU 32, and stores the values of the shared register in the RAM 33.

However, in the prior art ATAPI command receiving method, much time is spent by the CPU 32 to capture the value of the shared register, which is held by the ATAPI protocol control LSI 31, in the interrupt processing routine of the CPU 32, and thereby the other processings by the CPU 32 are adversely delayed.

In addition, when the ATAPI protocol control LSI 31 receives the next command or command packet from the host computer 1 while the CPU 32 is capturing the value of the command register or value of the command packet, there is a risk that the command register value or command packet value which is being captured by the CPU 32 should be destroyed.

SUMMARY OF THE INVENTION

It is an object of the present invention to provide an ATAPI command receiving method which can reduce the time for the interruption processing by the CPU and increase the stability of the system.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided a command receiving method in a device which comprises an LSI having a shared register storage area and a buffer memory and controlling an ATAPI (AT Attachment Packet Interface) protocol, and a CPU for executing control of the device having the LSI, and in the command receiving method, when a command is transmitted to the device from a host computer outside the device via an ATA bus, a shared register value stored in the shared register storage area is stored at a storage destination address in the buffer memory which is designated by the CPU, when the CPU gives a data storage permission to the LSI. Therefore, a reduction in the processing time due to elimination in capturing the shared register value by the CPU in the interrupt processing as well as an increase in the stability of the system can be attained.

Further, because the LSI can hold the command overwritten by the host computer without the intervention of the CPU and the CPU can designate the address to be stored in the buffer memory, plural sets of commands can be stored at arbitrary positions. Accordingly, it is easily possible to correspond to the overlapping function of the ATAPI protocol.

According to a 2nd aspect of the present invention, there is provided a command receiving method in a device which comprises an LSI having a shared register storage area and a buffer memory and controlling an ATAPI (AT Attachment Packet Interface) protocol, and a CPU for executing control of the device having the LSI, and in the command receiving method, when a command is transmitted to the device from a host computer outside the device via an ATA bus, a value stored in the shared register storage area is stored at a first storage destination address in the buffer memory which is designated by the CPU, when the CPU gives a data storage permission to the LSI, and the value stored in the shared register storage area is stored at a second storage destination address in the buffer memory which is designated by the CPU, when the CPU does not give a data storage permission to the LSI. Therefore, the reduction in the processing time due to the elimination in capturing the shared register value by the CPU in the interrupt processing and the increase in the stability of the system can be attained.

According to a 3rd aspect of the present invention, there is provided a command receiving method in a device which comprises an LSI having a shared register storage area and a buffer memory and controlling an ATAPI (AT Attachment Packet Interface) protocol, and a CPU for executing control of the device having the LSI, and in the command receiving method, when a command is transmitted to the device from a host computer outside the device via an ATA bus, a command register value, a command packet value and other shared register value which are stored in the shared register storage area are stored in this order from a storage destination address of an even number in the buffer memory which is designated by the CPU, when the CPU gives a data storage permission to the LSI. Therefore, for the CPU which is capable of performing the word access, the number of times of accesses for capturing the shared register values from the buffer memory can be reduced, thereby reducing the processing time of the CPU.

DETAILED DESCRIPTION OF THE PREFERRED EMBODIMENTS

[Embodiment 1]

Hereinafter, an ATAPI command receiving method according to the first embodiment of the present invention will be described with reference to FIGS. 1 and 2.

Figure 1:
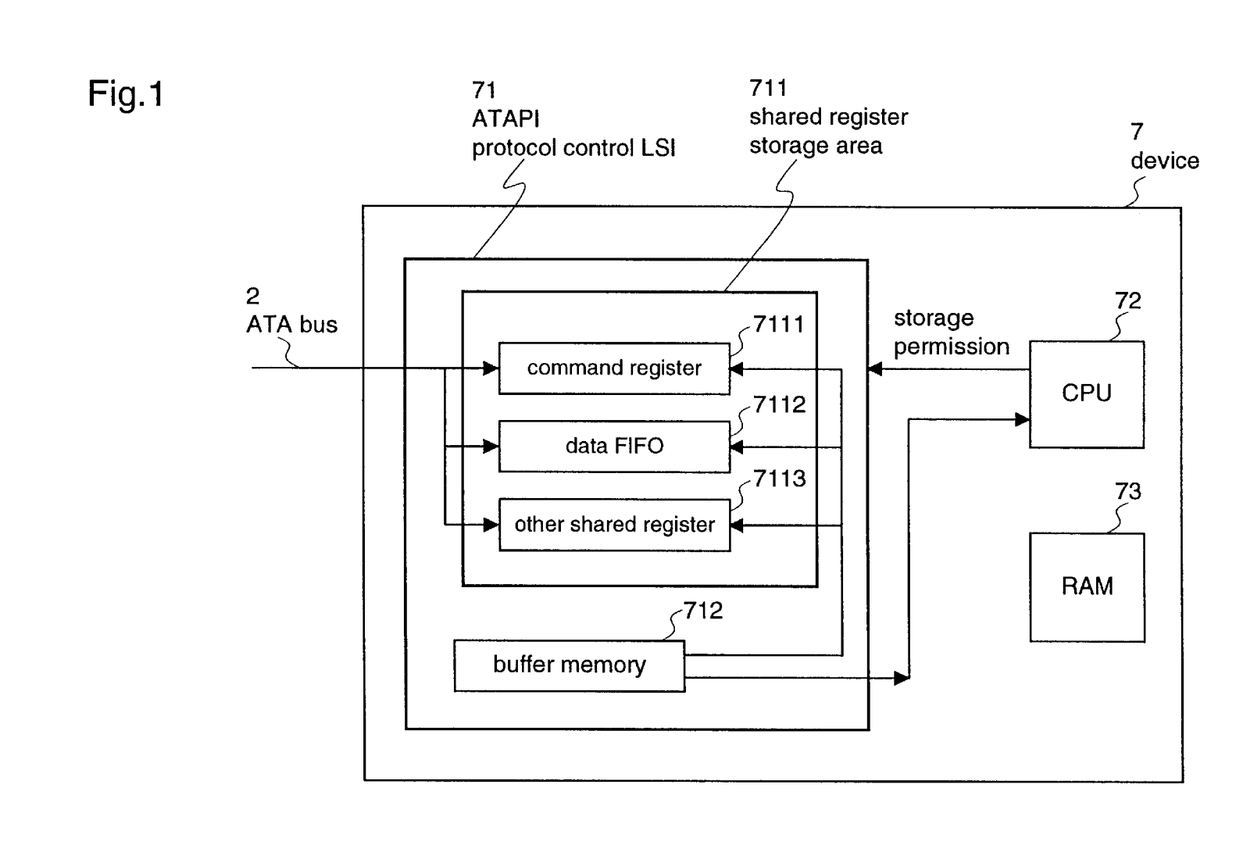
FIG. 1 is a conceptual diagram showing a structure of a device which uses an ATAPI command processing method according to the present invention and the flow of the command in the device.

FIG. 1 is a diagram showing a structure of a device 7 which uses the ATAPI command processing method according to the first embodiment and the flow of the command in the device 7.

As shown in FIG. 1, the device 7 comprises an ATAPI protocol control LSI 71 for controlling the ATAPI protocol, a CPU 72 for executing the control of the whole device 7, and a RAM 73 which is accessed by the CPU 72.

The ATAPI protocol control LSI 71 comprises a shared register storage area 711 for accessing the host computer 1, and a buffer memory 712 which can be used as a RAM of the CPU 72.

In the shared register storage area 711, there are a command register 7111 for containing a command register as a shared register, a data FIFO 7112 for containing command packets issued from the host computer 1, and an other shared register 7113 for containing other shared registers.

Figure 2:
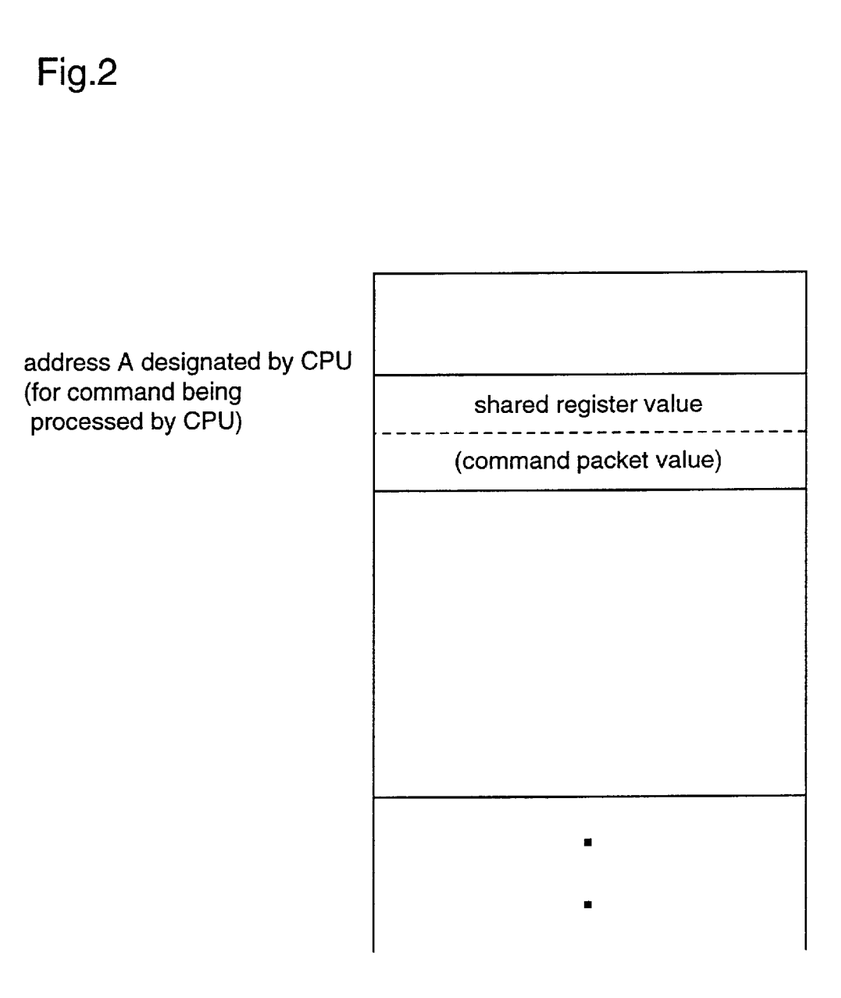
FIG. 2 is a diagram illustrating a construction of storage of shared register values in a buffer memory according to a first embodiment of the present invention.

FIG. 2 is a diagram showing a construction of storage of the shared register value or command packet in the buffer memory 712 in the ATAPI protocol control LSI 71 according to the first embodiment. As shown in FIG. 2, at a storage destination address A designated by the CPU 72, the shared register value (including the command packet value) is stored.

Hereinafter, the operation in the ATAPI command receiving method according to the first embodiment is described.

When the device 7 receives a command transmitted from the host computer 1 via the ATA bus 2, the ATAPI protocol control LSI 71 stores a command register value transmitted by the host computer 1 into the command register 7111 in the shared register storage area 711, a command packet value transmitted by the host computer 1 into the data FIFO 7112 in the shared register storage area 711, and other shared register values transmitted by the host computer 1 into the other shared register 7113 in the shared register storage area 711, respectively.

Then, in a case where the ATAPI protocol control LSI 71 is given a data storage permission by the CPU 72 when the device 7 has received the command transmitted from the host computer 1 via the ATA bus 2, the ATAPI protocol control LSI 71 stores the shared register value (including the command packet value) at the storage destination address A of the buffer memory 712 which is designated by the CPU 72, as shown in FIG. 2, and gives an interrupt instruction to the CPU 72. Further, the ATAPI protocol control LSI 71 cancels the data storage permission by itself.

After the CPU 72 recognizes the interrupt instruction, it shifts to the interrupt processing routine. Then, after the interrupt processing is completed, the CPU 72 shifts from the interrupt processing routine to the command processing routine, extracts the shared register value (including the command packet value) from the address A in the buffer memory 712 in the command processing routine, and thereafter executes the command processing. Then, after the command processing is completed, the CPU 72 gives the data storage permission again to the ATAPI protocol control LSI 71.

When a command is issued from the host computer when the aforementioned data storage permission is not given, the ATAPI protocol control LSI 71 stores the command register value transmitted by the host computer 1 in the command register 7111 in the shared register storage area 711, the command packet value transmitted by the host computer 1 in the data FIFO 7112 in the shared register storage area 711, and other shared register values transmitted by the host computer 1 in the other shared register 7113 in the shared register storage area 711, respectively, and gives the interrupt instruction to the CPU 72. In this case, the operation of the CPU 72 after receiving the interrupt instruction is as follows: in the interrupt processing routine, the CPU 72 accesses the shared register storage area 711 in the ATAPI protocol control LSI 71, then stores the value of the shared register in the RAM 73, thereafter shifts from the interrupt processing routine to the command processing routine, and in the command processing routine, extracts the shared register value (including the command packet value) from RAM 33 to execute the command processing.

As described above, in the ATAPI command receiving method according to the first embodiment, while the CPU 72 is performing the command processing after the ATAPI protocol control LSI 71 captures once the shared register value (including the command packet value) in the buffer memory 712, the data storage permission from the CPU 72 to the ATAPI protocol control LSI 71 is in the state of being canceled. When a command is issued by the host computer 1 during this time, the ATAPI protocol control LSI 71 temporarily stores the command register value transmitted by the host computer 1 into the command register 7111 in the shared register storage area 711, the command packet value into the data FIFO 7112 in the shared register storage area 711, and other shared register values into the other shared register 7113 in the shared register storage area 711, respectively. Therefore, as for the commands issued from the host computer 1, the first command is stored in the buffer memory 712, and the last (recent) command which is overwritten by the host computer 1 is stored in the shared register storage area 711 in the ATAPI protocol control LSI 71.

Therefore, according to the ATAPI command receiving method of the first embodiment, the time for the CPU 72 to capture the shared register value (including command packet value) for the first command in the interrupt processing routine can be omitted and the whole processing time of the CPU 72 can be reduced. In addition, the ATAPI protocol control LSI 71 can hold the commands which have been overwritten by the host computer 1, without intervention by the CPU 72. Further, since only one address of the buffer memory 712 is employed for storing the commands, the administration of the storage address is simplified as well as the storage size is minimized.

[Embodiment 2]

Next, an ATAPI command receiving method according to the second embodiment of the present invention will be described with reference to FIGS. 1 and 3. The same reference numerals as those in the above-mentioned first embodiment denote the same portions.

Figure 3:
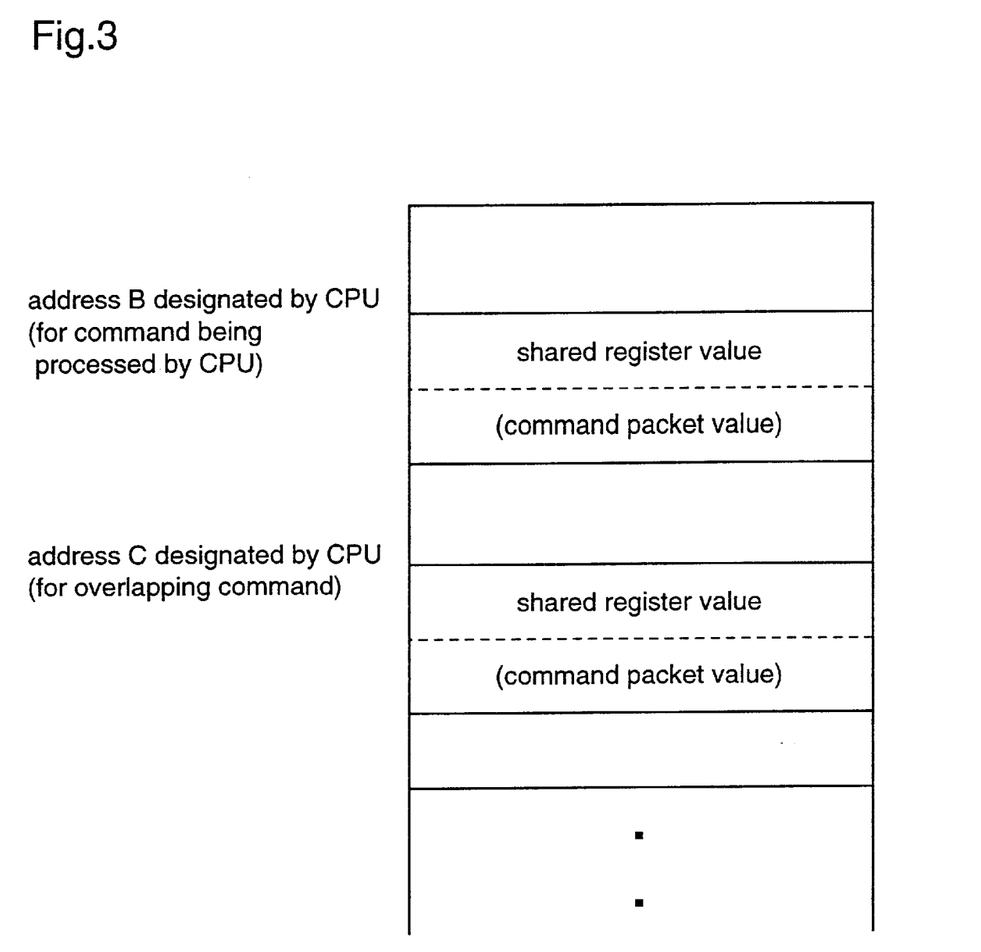
FIG. 3 is a diagram illustrating a construction of storage of shared register values in a buffer memory according to a second embodiment of the present invention.

FIG. 3 is a diagram illustrating a construction of storage of the shared register or command packet in the buffer memory 712 in the ATAPI protocol control LSI 71 of the device 7 according to the second embodiment. As shown in the figure, at storage destination addresses B and C which are designated by the CPU 72, shared register values (including command packet values) are stored.

Hereinafter, the operation in the ATAPI command receiving method according to the second embodiment is described.

When the device 7 receives a command transmitted from the host computer 1 via the ATA bus 2, the ATAPI protocol control LSI 71 stores the command register value transmitted by the host computer 1 into the command register 7111 in the shared register storage area 711, the command packet value transmitted by the host computer 1 into the data FIFO 7112 in the shared register storage area 711, and other shared register values transmitted by the host computer 1 into the other shared register 7113 in the shared register storage area 711, respectively.

Then, when the ATAPI protocol control LSI 71 is given the data storage permission by the CPU 72 when the device 7 has received the command transmitted from the host computer 1 via the ATA bus 2, the ATAPI protocol control LSI 71 stores the shared register value (including the command packet value) into the buffer memory 712 at the storage destination address B designated by the CPU 72, as shown in FIG. 3, then the ATAPI protocol control LSI 71 gives the interrupt instruction to the CPU 72, and further the ATAPI protocol control LSI 71 cancels the data storage permission by itself.

Thereafter, the CPU 72 shifts from the interrupt processing routine to the command processing routine, extracts the shared register value (including the command packet value) from the address B of the buffer memory 712 in the command processing routine, and thereafter executes the command processing. Then, after the command processing is completed, the CPU 72 gives the data storage permission again to the ATAPI protocol control LSI 71.

On the other hand, when the above-mentioned data storage permission is not given, the ATAPI protocol control LSI 71 stores the shared register value (including command packet value) into the buffer memory 712 at the storage destination address (overlapping storage destination address) C which is designated by the CPU 72, as shown in FIG. 3, and gives the interrupt instruction to the CPU 72. The operation of the CPU 72 after receiving the interrupt instruction is the same as described above, and it shifts from the interrupt processing routine to the command processing routine, extracts the shared register value (including the command packet value) from the address C of the buffer memory 712 in the command processing routine, and thereafter executes the command processing. Then, when there is no unprocessed command at the address B after the command processing is completed, the CPU 72 gives the data storage permission again to the ATAPI protocol control LSI 71. When there is an unprocessed command at the address B, after the command processing for that command is completed, the CPU 72 gives the data storage permission again to the ATAPI protocol control LSI 71.

As described above, according to the ATAPI command receiving method of the second embodiment, while the CPU 72 is performing the command processing after the ATAPI protocol control LSI 71 captures once the shared register value (including the command packet value) in the buffer memory 712, the data storage permission by the CPU 72 to the ATAPI protocol control LSI 71 is in the state of being canceled. When the command is issued by the host computer 1 during this time, the ATAPI protocol control LSI 71 stores the shared register value (including the command packet value) transmitted by the host computer 1 into the buffer memory 712 at the storage destination address C designated by the CPU 72. Therefore, as for the commands issued by the host computer 1, the first command is stored at the address B in the buffer memory 712 and the last (recent) command overwritten by the host computer 1 is stored at the address C in the buffer memory 712.

Therefore, according to the ATAPI command receiving method of the second embodiment, the time for the CPU 72 to capture the shared register value (including the command packet value) for an arbitrary command can be omitted in the operation of the interrupt processing routine, and the whole processing time of the CPU 72 can be reduced. In addition, it becomes possible that the ATAPI protocol control LSI 71 holds the commands overwritten by the host computer 1, without intervention by the CPU 72.

[Embodiment 3]

An ATAPI protocol receiving method according to a third embodiment of the present invention will be described with reference to FIGS. 1 and 4. The same reference numerals as those in the aforementioned embodiments denote the same portions.

Figure 4:
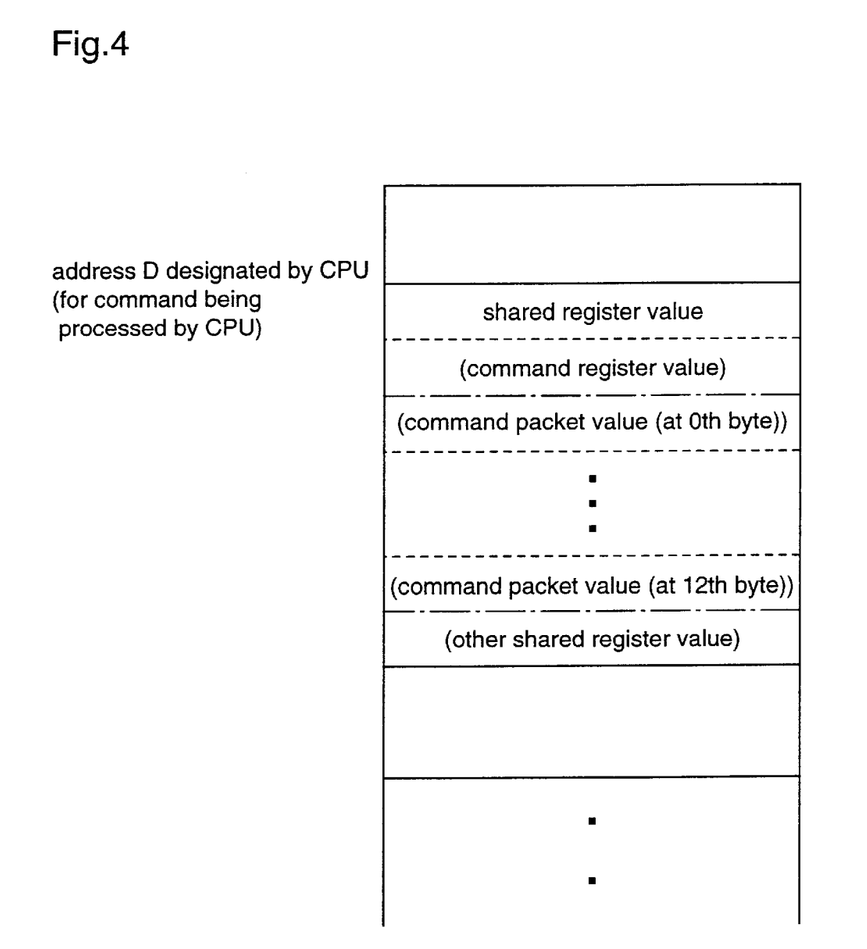
FIG. 4 is a diagram illustrating a construction of storage of shared register values in a buffer memory according to a third embodiment of the present invention.

FIG. 4 is a diagram illustrating a construction of storage of shared register values in the buffer memory 712 in the ATAPI protocol control LSI 71 in the device 7 according to the third embodiment. At a storage destination address D designated by the CPU 72, the shared register value (including the command packet value) is stored. Here, the value of the storage destination address D is an even number.

Hereinafter, the operation in the ATAPI command receiving method according to the third embodiment is described.

When the device 7 receives the command transmitted from the host computer 1 via the ATA bus 2, the ATAPI protocol control LSI 71 stores the command register value transmitted by the host computer 1 in the command register 7111 in the shared register storage area 711, the command packet value transmitted by the host computer 1 in the data FIFO 7112 in the shared register storage area 711, and other shared register values transmitted by the host computer 1 in the other shared register 7113 in the shared register storage area 711, respectively. Further, when the ATAPI protocol control LSI 71 is given the data storage permission by the CPU 72, the ATAPI protocol control LSI 71 stores successively the command register value, the command packet values, and the other shared register values in the buffer memory 712 from the storage destination address D of an even number which is designated by the CPU 72 as shown in FIG. 4, then the ATAPI protocol control LSI 71 gives the interrupt instruction to the CPU 72, and further the ATAPI protocol control LSI 71 cancels the data storage permission by itself.

Thereafter, the CPU 72 shifts from the interrupt processing routine to the command processing routine, captures the command register value and the 0th byte of command packet value from the address D and the successive address in the buffer memory 712 in the command processing routine, judges the necessity of capturing of the subsequent data from these two values, and executes the command processing. Then, after the command processing is completed, the CPU 72 gives the data storage permission again to the ATAPI protocol control LSI 71.

Then, when the device 7 receives the command transmitted from the host computer 1 via the ATA bus 2 in a case where the ATAPI protocol control LSI 71 is not given the data storage permission by the CPU 72, the ATAPI protocol control LSI 71 stores the command register value transmitted by the host computer 1 into the command register 7111 in the shared register storage area 711, the command packet value transmitted by the host computer 1 into the data FIFO 7112 in the shared register storage are 711, and other shared register values transmitted by the host computer 1 into the other shared register 7113 in the shared register storage area 711, respectively, and gives the interrupt instruction to the CPU 72. In this case, the operation of the CPU 72 after receiving the interrupt instruction is as follows: in the interrupt processing routine, the CPU 72 accesses the shared register storage area 711 in the ATAPI protocol control LSI 71, then stores the value of the shared register in the RAM 73, thereafter shifts from the interrupt processing routine to the command processing routine, and in the command processing routine, extracts the shared register value (including the command packet value) from RAM 33 to execute the command processing.

As described above, in the ATAPI command receiving method according to the third embodiment, when the CPU 72 gives the data storage permission to the ATAPI protocol control LSI 71, the command register value, the command packet values and other shared register values stored in the shared register storage area 711 are successively stored into the buffer memory 712 from the storage destination address of an even number designated by the CPU 72 in this order, thus the CPU 72 can judge the presence or absence of data transmission from the command register value and the command packet value at the 0th byte captured from the address D of an even number in the buffer memory 712, and thereafter remaining command packet values to be captured by the CPU 72 or other shared register values can be deleted, whereby the number of memory accesses can be reduced.

More particularly, when the CPU 72 is capable of performing word (2 byte) access, if the address D of an even number is set as the first address of the storage destination address, the CPU 72 performs reading of data by 2 bytes in the order of firstly an even number and then an odd number, whereby the number of memory accesses can be reduced. There are such commands among the ones from the host computer that the contents of the command processing can be determined by only receiving the command register value and first one byte of command packet value. Therefore, not by storing the command register value and the command packet value so that each of them starts from an even number address but by storing the command register value of one byte at an even number address and storing the command packet value at an odd number address and subsequent addresses of the buffer memory, which is successive to the even number address for storing the command register value of one byte, it is possible to improve the efficiency of the command processing.

In this way, it is possible to omit the time for the CPU 72 to capture the shared register values in the command processing, thereby resulting in great reduction in the whole processing time of the CPU 72.

What is claimed is:

1. A command receiving method in a device which comprises an LSI having a shared register storage area and a buffer memory and controlling an ATAPI (AT Attachment Packet Interface) protocol, and a CPU for executing control of the device having the LSI, wherein when a command is transmitted to the device from a host computer outside the device via an ATA bus, a shared register value stored in the shared register storage area is stored at a storage destination address in the buffer memory which is designated by the CPU, when the CPU gives a data storage permission to the LSI.

2. A command receiving method in a device which comprises an LSI having a shared register storage area and a buffer memory and controlling an ATAPI (AT Attachment Packet Interface) protocol, and a CPU for executing control of the device having the LSI, wherein when a command is transmitted to the device from a host computer outside the device via an ATA bus, a value stored in the shared register storage area is stored at a first storage destination address in the buffer memory which is designated by the CPU, when the CPU gives a data storage permission to the LSI, and the value stored in the shared register storage area is stored at a second storage destination address in the buffer memory which is designated by the CPU, when the CPU does not give a data storage permission to the LSI.

3. A command receiving method in a device which comprises an LSI having a shared register storage area and a buffer memory and controlling an ATAPI (AT Attachment Packet Interface) protocol, and a CPU for executing control of the device having the LSI, wherein when a command is transmitted to the device from a host computer outside the device via an ATA bus, a command register value, a command packet value and other shared register value which are stored in the shared register storage area are stored in this order from a storage destination address of an even number in the buffer memory which is designated by the CPU, when the CPU gives a data storage permission to the LSI.

* * * * *